US009032295B1

(12) United States Patent
Patel et al.

(10) Patent No.: US 9,032,295 B1
(45) Date of Patent: May 12, 2015

(54) METHOD FOR DISPLAYING FILES FROM A PLURALITY OF DEVICES IN A MULTI-VIEW INTERFACE AND FOR ENABLING OPERATIONS TO BE PERFORMED ON SUCH FILES THROUGH SUCH INTERFACE (75) Inventors: Vivek Patel, San Carlos, CA (US); Mark C. Dixon, Redwood City, CA (US); Gibu Thomas, San Francisco, CA (US); Ashish Chordia, Santa Clara, CA (US); Nichole C. Gabriel, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 1292 days.

(21) Appl. No.: 12/077,533

(22) Filed: Mar. 19, 2008

(51) Int. Cl.
*G06F 3/048* (2013.01)
*G06F 11/07* (2006.01)

(52) U.S. Cl.
CPC ...................................... *G06F 11/07* (2013.01)

(58) Field of Classification Search
USPC ......................................... 715/717, 718, 734
See application file for complete search history.

(56) References Cited

U.S. PATENT DOCUMENTS

| 5,862,346 | A | 1/1999 | Kley et al. | |
|---|---|---|---|---|
| 6,348,932 | B1 * | 2/2002 | Nishikawa et al. | 715/719 |
| 6,407,750 | B1 * | 6/2002 | Gioscia et al. | 715/716 |
| 6,636,873 | B1 | 10/2003 | Carini et al. | |
| 6,636,888 | B1 | 10/2003 | Bookspan et al. | |
| 6,904,185 | B1 | 6/2005 | Wilkins et al. | |
| 7,039,723 | B2 | 5/2006 | Hu et al. | |
| 7,103,357 | B2 | 9/2006 | Kirani et al. | |
| 7,139,555 | B2 | 11/2006 | Apfel | |
| 7,319,536 | B1 | 1/2008 | Wilkins et al. | |
| 7,321,919 | B2 | 1/2008 | Jacobs et al. | |
| 7,369,161 | B2 | 5/2008 | Easwar et al. | |
| 7,372,485 | B1 | 5/2008 | Bodnar et al. | |
| 7,441,180 | B1 | 10/2008 | Kaczmarek et al. | |
| 7,502,795 | B1 | 3/2009 | Svendsen et al. | |
| 7,576,752 | B1 * | 8/2009 | Benson et al. | 345/619 |
| 7,680,067 | B2 | 3/2010 | Prasad et al. | |
| 7,707,500 | B2 * | 4/2010 | Martinez | 715/717 |
| 7,747,596 | B2 * | 6/2010 | Bigioi et al. | 707/705 |
| 7,774,326 | B2 * | 8/2010 | Arrouye et al. | 707/705 |
| 7,809,682 | B2 | 10/2010 | Paterson et al. | |
| 7,930,270 | B2 * | 4/2011 | Tsang | 707/610 |
| 8,181,114 | B2 * | 5/2012 | Saka | 715/748 |
| 8,321,374 | B2 | 11/2012 | Holt et al. | |
| 2002/0003548 | A1 * | 1/2002 | Krusche et al. | 345/736 |
| 2002/0013852 | A1 | 1/2002 | Janik | |
| 2002/0044159 | A1 | 4/2002 | Kuroiwa et al. | |
| 2002/0059604 | A1 | 5/2002 | Papagan et al. | |

(Continued)

*Primary Examiner* — Anil Bhargava
(74) *Attorney, Agent, or Firm* — Fenwick & West LLP (57) ABSTRACT In a synchronization or back-up system that synchronizes and/or back-ups files from multiple computing devices, the present invention provides a method for (1) displaying files from multiple computing devices in a multi-view user interface and (2) enabling content and file operations to be performed on such files through the user interface. The multi-view interface includes a file-system view and one or more media-specific views. In the file-system view files are organized in the same way in which they are organized on the devices on which they are stored. The file-system view in the interface looks essentially the same as the file-system view on client devices. In the file-system view, users can perform file operations on files. In the media-specific view files are organized by media category. In one embodiment of the media-specific view, files are organized by metadata that relates to the files content. In the media-specific view, users can perform content operations on the files.

24 Claims, 9 Drawing Sheets

(56) References Cited

U.S. PATENT DOCUMENTS

| | | |
|---|---|---|
| 2002/0065848 A1 | 5/2002 | Walker et al. |
| 2002/0066050 A1 | 5/2002 | Lerman et al. |
| 2002/0091697 A1* | 7/2002 | Huang et al. .................... 707/10 |
| 2002/0099772 A1 | 7/2002 | Deshpande et al. |
| 2002/0129096 A1 | 9/2002 | Mansour et al. |
| 2003/0004952 A1 | 1/2003 | Nixon et al. |
| 2003/0014478 A1 | 1/2003 | Noble |
| 2003/0131098 A1 | 7/2003 | Huntington et al. |
| 2003/0159136 A1 | 8/2003 | Huang et al. |
| 2003/0218633 A1 | 11/2003 | Mikhail et al. |
| 2004/0024979 A1 | 2/2004 | Kaminsky et al. |
| 2004/0044732 A1 | 3/2004 | Fushiki et al. |
| 2004/0088420 A1 | 5/2004 | Allen et al. |
| 2004/0148207 A1 | 7/2004 | Smith et al. |
| 2004/0148375 A1 | 7/2004 | Levett et al. |
| 2005/0044164 A1 | 2/2005 | O'Farrell et al. |
| 2005/0149213 A1* | 7/2005 | Guzak et al. .................... 700/94 |
| 2005/0165869 A1 | 7/2005 | Huang et al. |
| 2006/0052091 A1 | 3/2006 | Onyon et al. |
| 2006/0156239 A1* | 7/2006 | Jobs et al. ...................... 715/727 |
| 2006/0242206 A1 | 10/2006 | Brezak et al. |
| 2007/0005581 A1* | 1/2007 | Arrouye et al. .................. 707/4 |
| 2007/0005707 A1* | 1/2007 | Teodosiu et al. ............... 709/206 |
| 2007/0043830 A1 | 2/2007 | Housenbold et al. |
| 2007/0156434 A1* | 7/2007 | Martin et al. .................... 705/1 |
| 2007/0179989 A1 | 8/2007 | Maes |
| 2007/0180075 A1 | 8/2007 | Chasman et al. |
| 2007/0209005 A1* | 9/2007 | Shaver et al. ................. 715/733 |
| 2007/0250645 A1 | 10/2007 | Meadows et al. |
| 2007/0276836 A1 | 11/2007 | Chatterjee et al. |
| 2008/0109448 A1 | 5/2008 | Aboel-Nil et al. |
| 2008/0126936 A1* | 5/2008 | Williams ...................... 715/717 |
| 2008/0168185 A1* | 7/2008 | Robbin et al. ................. 709/248 |
| 2008/0208870 A1* | 8/2008 | Tsang ............................ 707/10 |
| 2009/0094252 A1 | 4/2009 | Wong et al. |
| 2009/0183060 A1* | 7/2009 | Heller et al. ................... 715/202 |
| 2009/0187609 A1 | 7/2009 | Barton et al. |
| 2010/0063670 A1 | 3/2010 | Brzezinski et al. |

\* cited by examiner

METHOD FOR DISPLAYING FILES FROM A PLURALITY OF DEVICES IN A MULTI-VIEW INTERFACE AND FOR ENABLING OPERATIONS TO BE PERFORMED ON SUCH FILES THROUGH SUCH INTERFACE

BACKGROUND OF THE INVENTION

1. Field of the Invention

This invention relates generally to synchronization/back-up server systems, and more, specifically, to a method for displaying files and data objects from a plurality of devices in such system.

2. Description of the Background Art

Back-up systems typically enable users to back up files from a plurality of computers to a central server. Some systems provide an interface through which users can view and access files from the computers backed up by the server. Such systems provide a file-system view of files for each computer. Although it is useful to have a file-system view for each computer, such a view does not enable a user to see a view of files across computers. Consequently, it is desirable to have an improved user interface that has multiple views of the backed-up files, where one or more views combines files from different computers. Also, it is desirable to any able to control any of the files on any of the devices through such improved interface.

SUMMARY

In a synchronization or back-up system that synchronizes and/or backs up files from multiple computing devices, the present invention provides a method for (1) displaying files from multiple computing devices in a multi-view user interface and (2) enabling content and file operations to be performed on such files through the user interface.

In the invention, files from multiple computing devices are displayed in an interface that includes a "file-system view" and one or more "media-specific views." In the file-system view, files are organized in the same way in which they are organized on the devices on which they are stored. The file-system view in the interface looks essentially the same as the file-system view on client devices. In one embodiment, files are organized by the client device on which they are stored. For example, if a user is accessing files from both computer A and computer B, the file-system view will show which files are stored on computer A and which files are stored on computer B. In the file-system view, the user can perform file operations (e.g., delete, copy, paste, move, etc.) on the files.

In media-specific views, files are organized by media category. For examples, if a user is accessing files that are stored on computer A and B, the photo files from both computers are displayed in a "photo view," the word processing files from both computers are displayed in a "documents view," the music files from both computers are displayed in the "music view," and the video files from both computers are displayed in the "video view." In the preferred embodiment of the media-specific view, files are not organized by the computer on which they are stored. In one embodiment, they are organized in accordance with metadata related to the content of the files. For example, in a music view, files may organized by artist or album, regardless of the client computing device on which the files are stored. In a photo view, photos may be organized by album or event, regardless of the client computing device on which the photos are stored. In the media-specific view, users can perform content operations on the files.

A user can seamlessly move between the file-system view and the media-specific views. In a further embodiment of the invention, the user also can view data objects (such as email messages, calendar appointments, and contacts) through the interface. In such an embodiment, there can be a media-specific view for each type of data object.

DETAILED DESCRIPTION OF THE PREFERRED EMBODIMENTS

In a synchronization or back-up system that synchronizes and/or backs up files from multiple computing devices, the present invention provides a method for (1) displaying files from multiple computing devices in a multi-view user interface and (2) enabling content and file operations to be performed on such files through the user interface.

Figure 4:
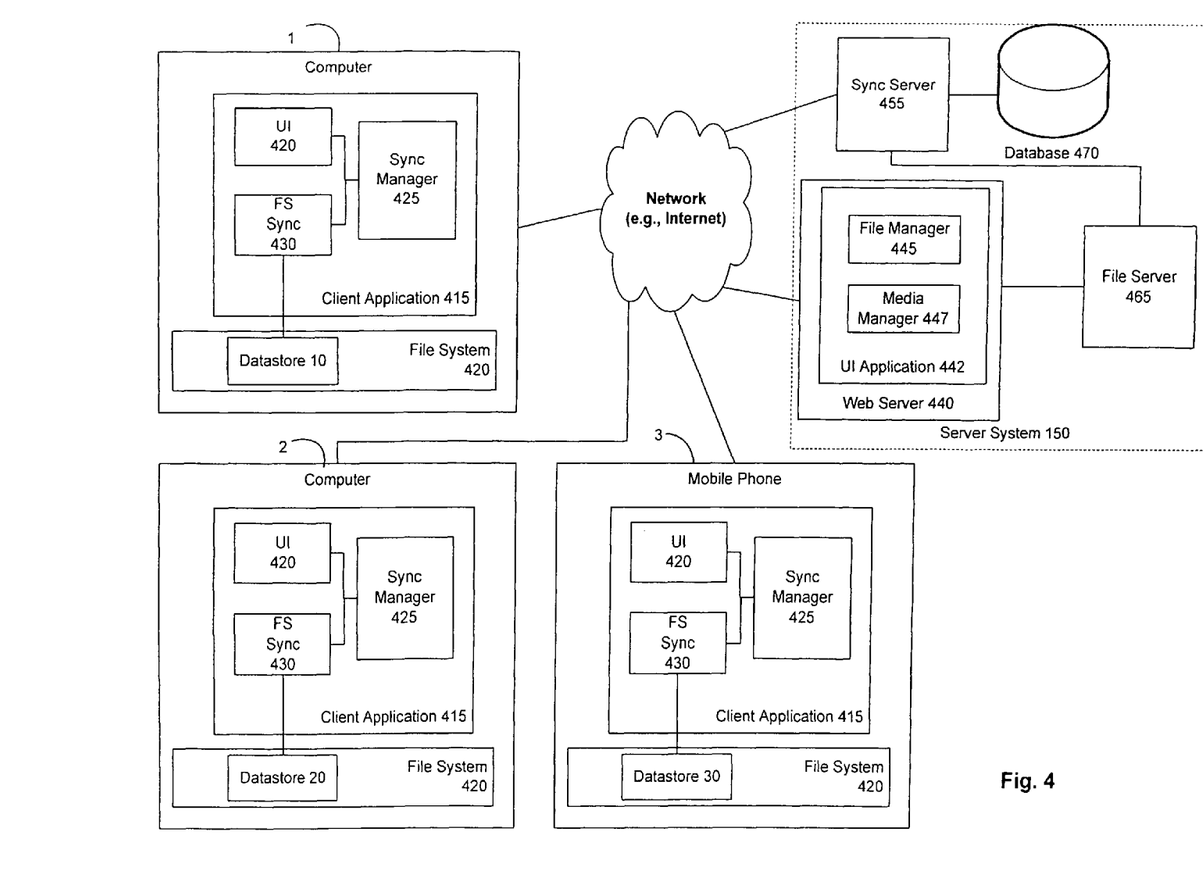
FIG. 4 is a more detailed block diagram of a synchronization/back-up system that can implement the present invention.

An example of a synchronization/back-up system is disclosed in U.S. patent application Ser. No. 11/269,498 titled "Method and Apparatus for a File Sharing and Synchronization System," and filed on Nov. 8, 2005 with first-named inventor Jack B. Strong, the contents of which are incorporated by reference as if fully disclosed herein. Another example is depicted in FIG. 4.

Figure 1:
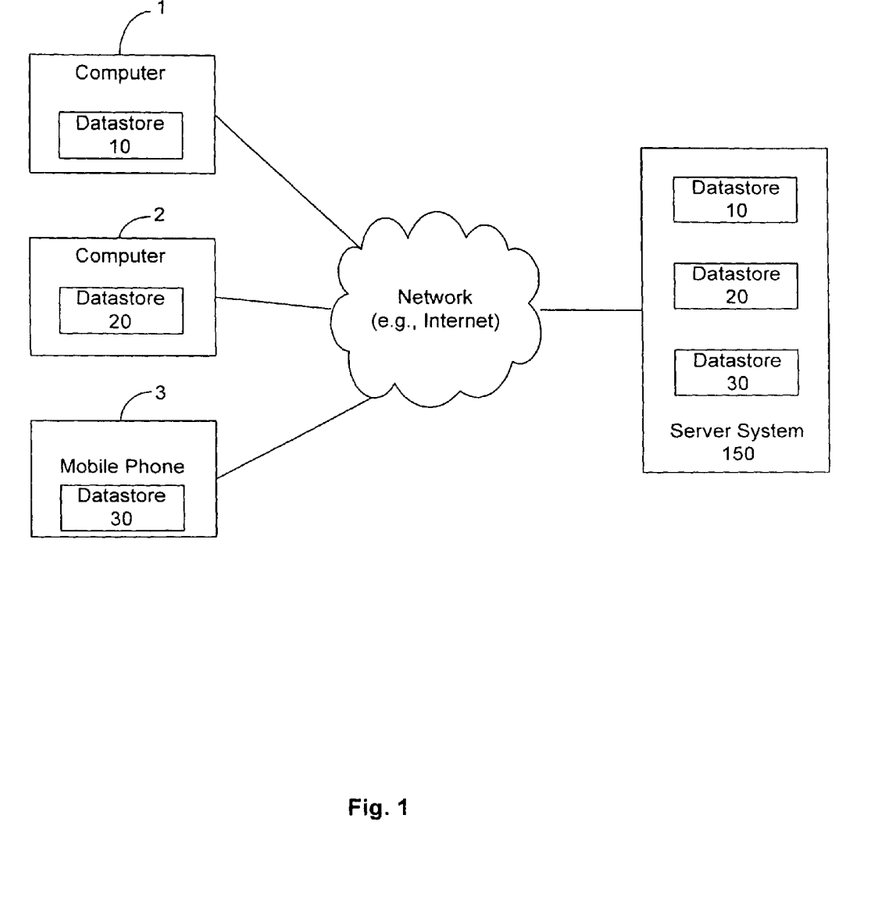
FIG. 1 is a block diagram that illustrates an example of a synchronization/back-up system.

FIG. 1 illustrates an example of a network that includes a synchronization/back-up system. In the illustrated system, a user can back up files to server system 150. FIG. 1 shows three client computing devices, belonging to the same user, that are connected via a network (such as the Internet) to server system 150. The client computing devices are computer 1 (e.g., a home computer), computer 2 (e.g., a work computer), and mobile phone 3. Computer 1, computer 2, and mobile phone 3 include "datastores" 10, 20, and 30, respectively, that a user has elected to back up to server system 150. Those skilled in the art will appreciate that there are other type of computing devices, such as Personal Digital Assistants (PDAs) and set-top TV boxes, and this invention is in no way limited to files from the illustrated computing devices.

A "datastore" is the files, data objects, and corresponding metadata on a device that are backed up by the server system. Examples of metadata include the title of a file, the folder in which a file is stored, the date a file was created, etc. Datastore 10 includes the files and metadata backed up on computer 1, datastore 20 includes files and metadata backed up on computer 2, and datastore 30 includes the files and metadata backed up on mobile phone 3.

A copy of datastores 10, 20, and 30 are uploaded to and stored by server system 150. Server system 150 ensures that the copies of datastores 10, 20, and 30 stored by server system 150 are synchronized with the actual datastores 10, 20, and 30 on client devices 1, 2, and 3. In one embodiment, server system 150 also synchronizes files across client devices 1, 2, and 3.

Figure 2:
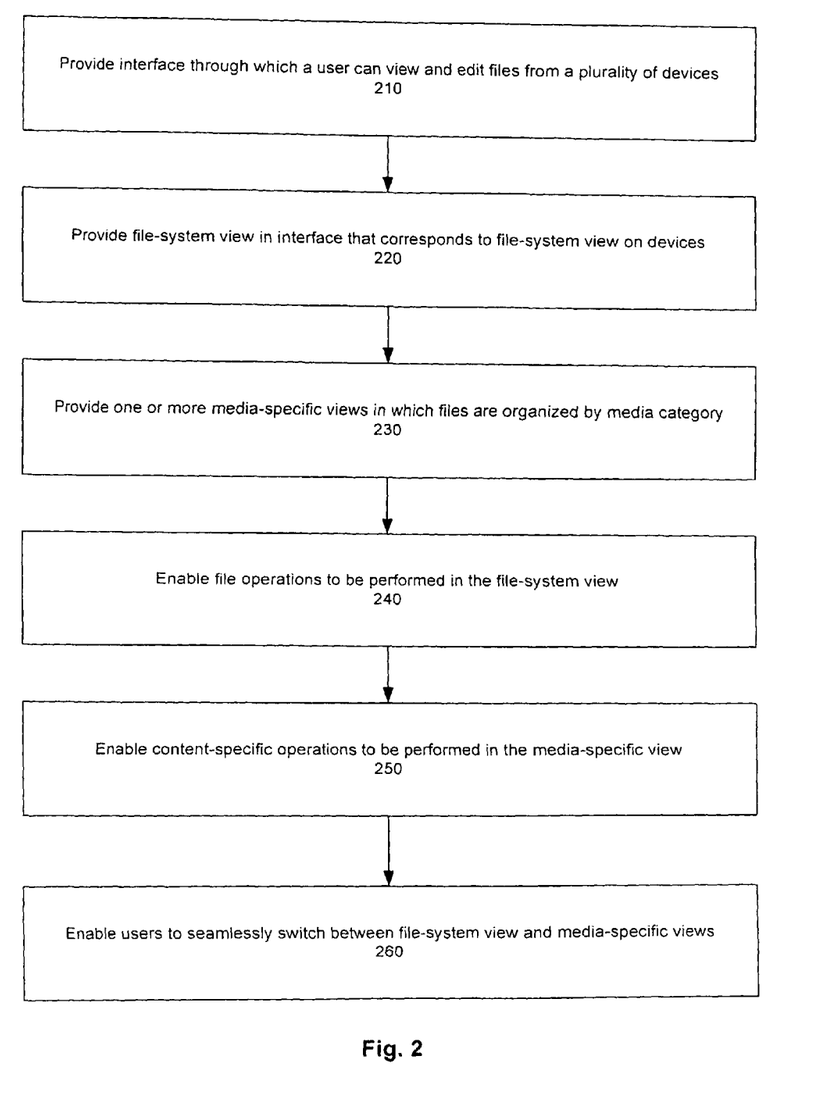
FIG. 2 is a flow chart that illustrates a method for displaying files in a multi-view interface and for enabling operations to be performed on files through such interface.

The server system 150 provides an interface through which a user can access and view files stored by the server system 150. FIG. 2, discussed below, illustrates one way in which this interface may be provided. Since a user can back up files from multiple devices to database server system 150, the interface provided by server system 150 enables users to remotely view and operate on files from multiple computing devices.

FIG. 2 illustrates a method for displaying files from multiple computing devices and for enabling content and file operations to be performed on such files. Such method may be implemented by a computer system, such as server system 150, that has access to files from multiple client computing devices. For example purposes, this method will be described with respect to a server, but those skilled in the art will appreciate that a client device may be able to act like a server and access files from other networked computer devices.

Referring to FIG. 2, the server (such as a web server 440 in FIG. 4) provides an interface through which a user can view and edit files from a plurality of devices (step 210). In one embodiment, the interface is a web interface displayed in a user's browser. However, in alternate embodiments, the interface could be provided by a client application running on a client device that has access to files from multiple devices.

Within the interface, the server provides a "file-system view" in which user-accessible files are organized in the same way as they are organized in the file systems of the devices on which such files are stored (step 220). In one embodiment, there is a file-system view for each device. In such embodiment, the file-system view provided in the interface corresponds to the file-system view of the files on the device itself. In an alternate embodiment, files from multiple devices are combined into a single file-system view (i.e., the file system view need not be device-specific).

Figure 3A:
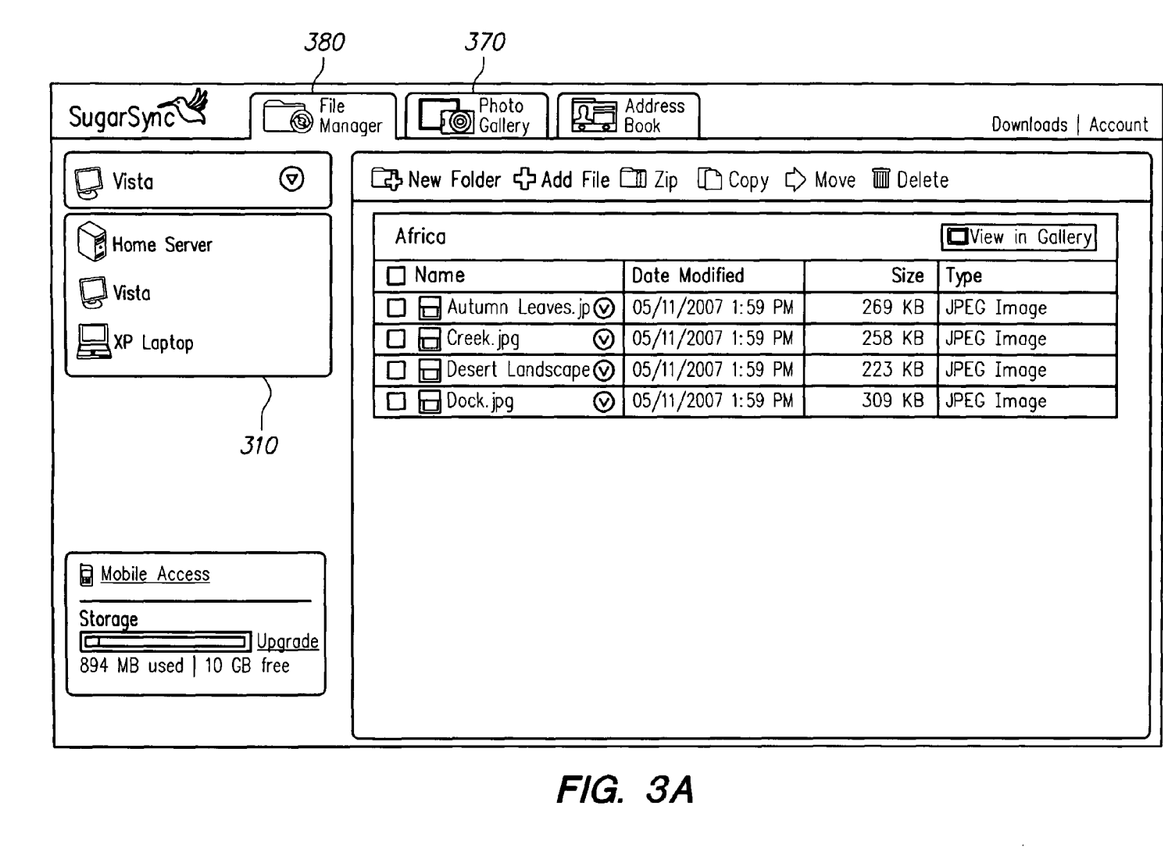
FIGS. 3*a*-3*d* are screen shots that illustrate examples of a file-system view and a media-specific view.
Figure 3B:
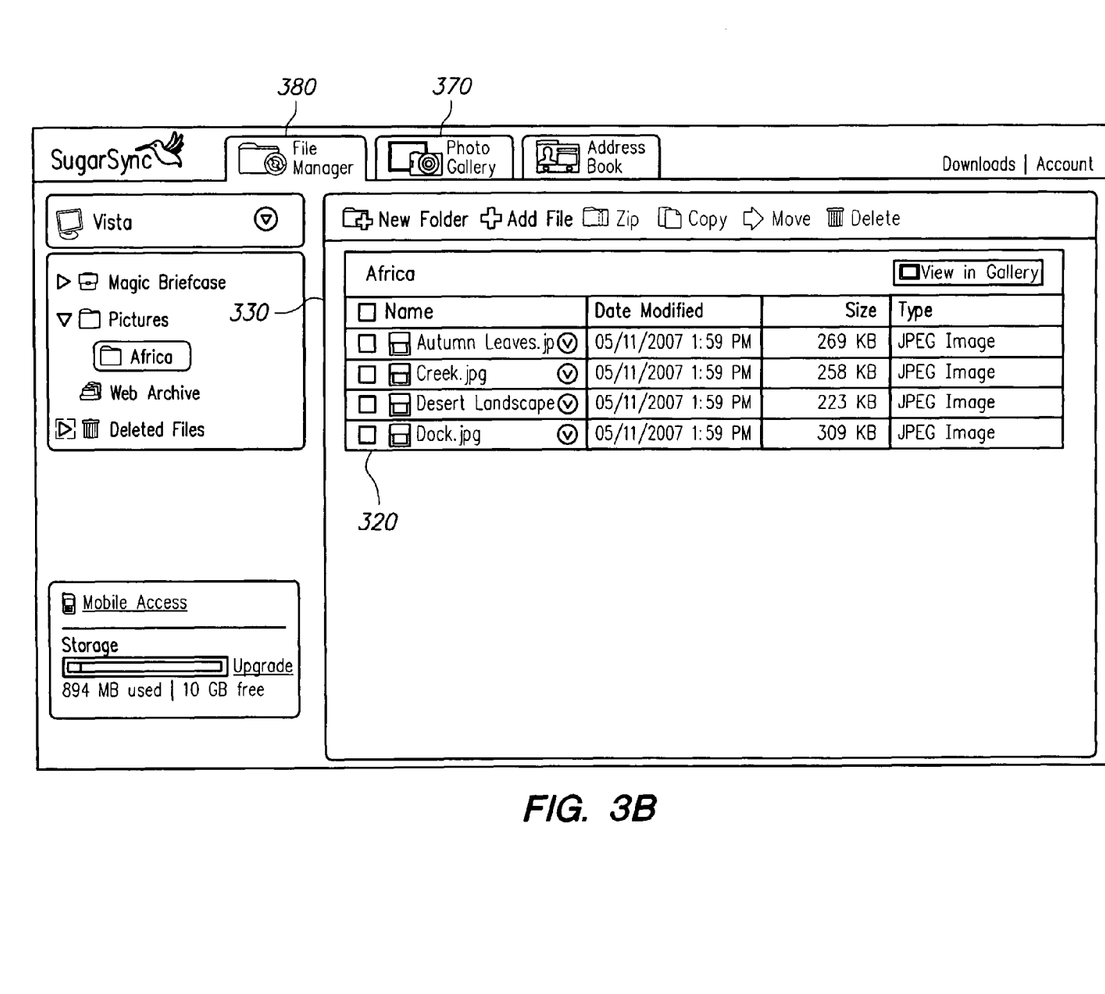
Figure 3C:
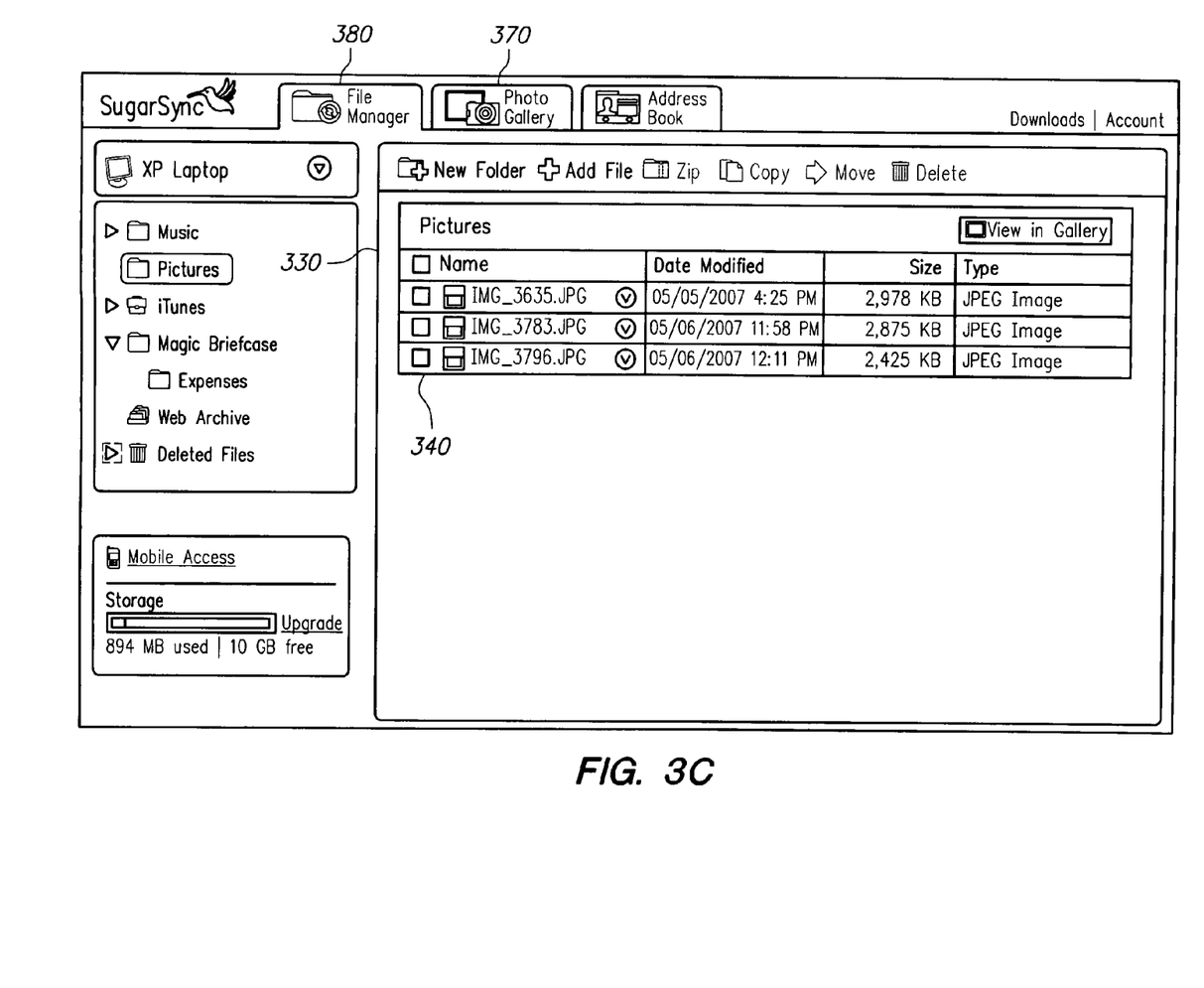

FIGS. 3a-3c illustrate examples of a file-system view. In this example, there is a file-system view for each backed-up device. As shown in FIG. 3a, the example file-system view includes a menu 310 from which a user can select one of the user's client devices, named "Vista," "Home server," and "XP Laptop." By selecting a device in the drop-down menu 310, the user can see the files backed-up to the server on such device. In the screen in FIG. 3b, the user has chosen to view the files on "Vista" and has selected the "Africa" sub-folder in the "Pictures" folder. Consequently, photo files 320 from the "Africa" folder are displayed in window 330. In FIG. 3c, the user has chosen to view files from the device labeled "XP Laptop" and has selected the "Pictures" folder. Consequently, photo files 340 from the "Pictures" folder are displayed in window 330.

Referring again to FIG. 2, the server also provides one or more "media-specific views" in which files are organized by media category (step 230). Each media-specific view corresponds to a media category. For example, all photos in backed-up datastores can be shown in the "photo view," all word-processing documents can be shown in a "documents view," all music files can be stored in a "music view," and all video files can be stored in a "video view."

Figure 3D:
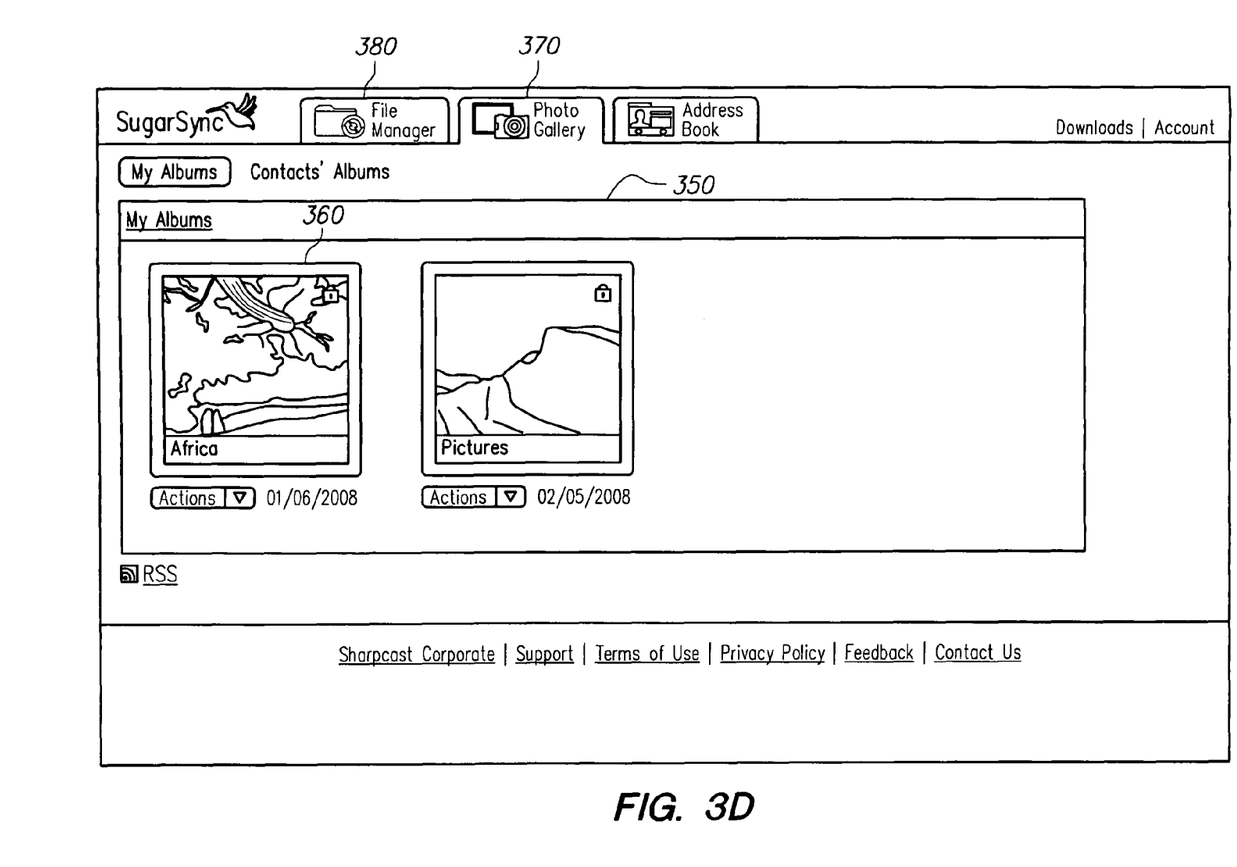

FIG. 3d illustrates an example of a media-specific view for photos. In this example, all the backed-up photo files from the user's devices (Vista, XP Laptop, and work server) are displayed in a photo-specific view 350 called the "Photo Gallery." Each folder containing photos on a user's device is converted into a photo album in the Photo Gallery, where each photo album has the same name as the folder corresponding to such album. The photos from the "Africa" folder on the device labeled "Vista" are displayed in the photo album 360 titled "Africa." The photos from the "Pictures" folder on the device labeled "XP Laptop" are displayed in the photo album titled "Pictures." Although not displayed, there could also be media-specific views for other types of media, such as video files, music files, and word-processing documents. FIGS. 3a-3d are just examples of one way to implement the interface of the present invention, and the invention is in no way limited to these examples.

In the preferred embodiment, files of the same media type from multiple devices are combined into a single media-specific view, where they are not necessarily organized by device. In one embodiment, files within a media-specific view are organized in accordance with metadata related to the content of the files in the view. For example, in a music view, files may organized by artist or album, regardless of the client computing device on which the files are stored. In a photo view, photos may be organized by album or event, regardless of the client computing device on which the photos are stored.

The server enables file operations to be performed on files in the file-system view (step 240). Examples of file operations include deleting a file, copying a file, pasting a file, and moving a file. Such operations also can be performed on entire folders in the file system view (e.g., folders can be copied, deleted, pasted and moved). If a user performs a file operation (including operations on folders) in the file-system view, the operation is propagated to all client devices that have registered for notices of changes to the file (which is usually those systems that also store a copy of the file). For instance, in the example system in FIG. 1, if the user, through a file-system view provided by server system 150, deletes a file for which computer 1 has registered for notices, computer 1 is notified of the file operation and modifies its file system accordingly. The server system 150 also would modify its copy of datastore 10 in accordance with the file operation.

The server enables content-specific operations to be performed in the media-specific view (step 250). If a user edits the content of a file through the media-specific view, the edits are propagated to the device(s) that have registered for notices related to the file (as stated above, this usually devices that also store a copy of the file). Content-specific operations include editing the content of a file. For example, in the photo view illustrated in FIG. 3d, the user can crop a photo and the changes to the photo will be propagated to the device(s) that have registered for notices of the change.

Users can seamlessly switch between the file-system view and the media-specific view (step 260). In the example file-system view shown in FIGS. 3a-3c, the user can select the "Photo Gallery" tab 370 to switch to the Photo Gallery. Similarly, from the Photo Gallery, the user can select the "File Manager" tab 380 to switch to the file-system view. In one embodiment, if the user is in the media-specific view and attempts to perform a file operation, the user is automatically switched to the file-system view.

In a further embodiment of the invention, the user also can view data objects (such as email messages, calendar appointments, and contacts) through the interface. In such an embodiment, there can be a media-specific view for each type of data object. Data objects may or may not be displayed in the file-system view.

FIG. 4 illustrates a more detailed example of the systems displayed in FIG. 1. Each of the client devices 1, 2, 3 includes a client synchronization application 415 that monitors a datastore (10, 20, 30) in the file system 420 on the client device. As stated above, the datastore includes the files (and data objects, if applicable) that a user wishes to back up to server system 150 (and possibly synchronize with other client devices), as well as the corresponding metadata.

The client synchronization application 415 has a UI Module 420 that provides a user interface to the backed up/synchronized files. Like the interface provided by server system 150, this interface may have a file-system view and one or more media-specific views of the files on the client device. The client application 415 also has a File System Sync module 430 that monitors the datastore in the client device's file system 420 for changes. When a client device is online, the Sync Manager 425 on such device maintains a dedicated connection with server system 150 and immediately uploads any changes to the datastore to server system 150. When online, the Sync Manager 425 register with the server system 150 for notices of network changes (i.e., changes made on the server or another client device) relevant to such client device, and receives any such notices from the server system 150.

The server system 150 includes a Sync Server 455, File Server 465, Web Server 440, and database 470. File server 465 stores a copy of each backed-up datastore. The Sync Server 455 keeps track of which client devices 1, 2, and 3 have registered for which notices of changes to data in the backed-up datastores. Also, the Sync Server 455 stores the metadata associated with backed-up datastores stored by File Server 465 in database 470.

Those skilled in the art will appreciate that the server system 150 can be scaled to include multiple sync servers and file servers that work together to perform the functionality described with respect to server system 150.

Web server 440 provides a web interface to users that have access to files stored by server system 150. The interface is provided by a UI application 442 that includes a File Manager 445 and a Media Manager 447. These modules are described in more detail with respect to FIG. 5.

Figure 5A:
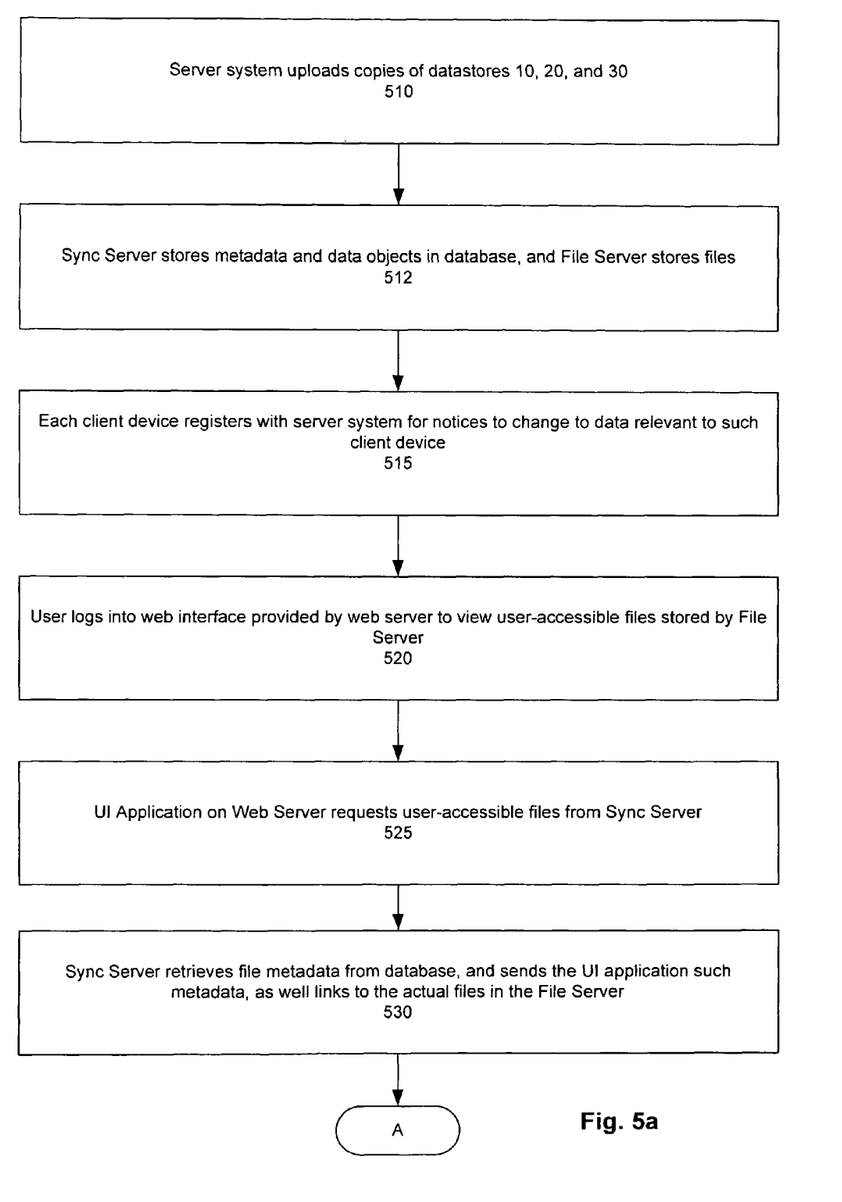
FIG. 5 is a flowchart that shows one way in which the system of FIG. 4 can implement the present invention.
Figure 5B:
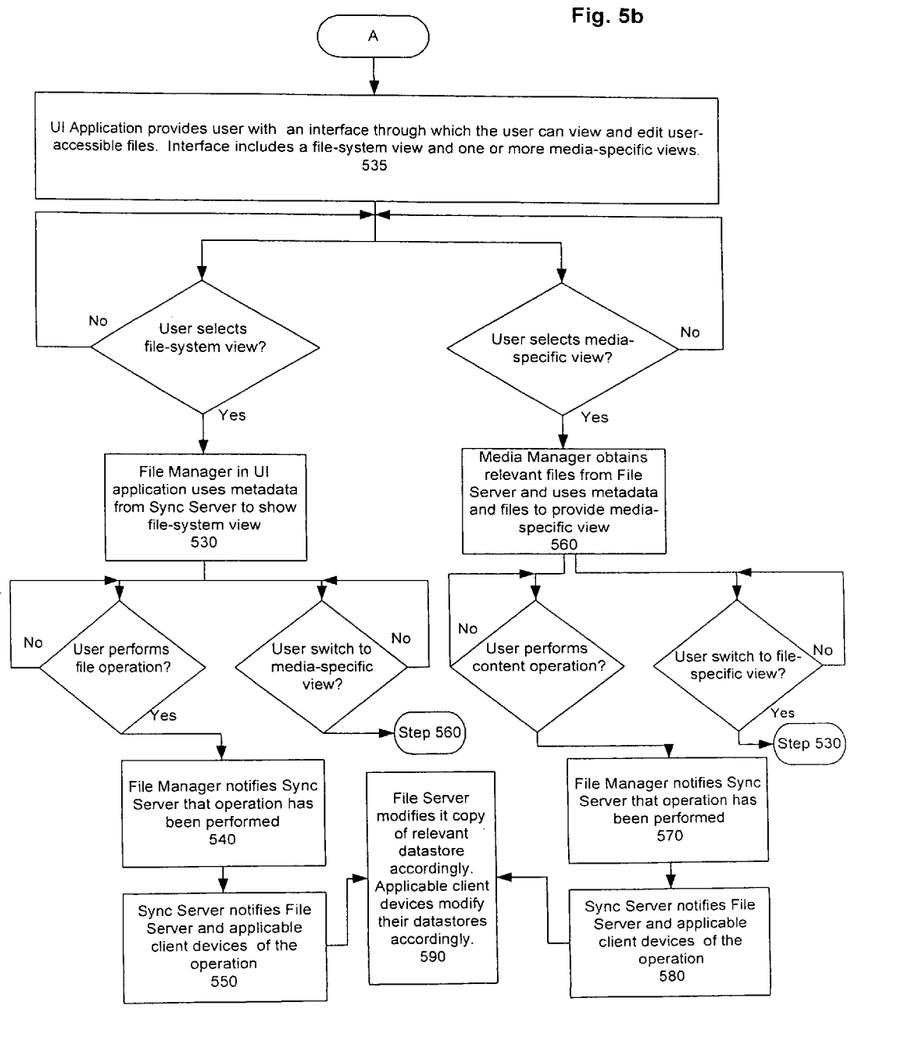

FIG. 5 is a flow chart that shows one way in which the system of FIG. 4 can implement an embodiment of the present invention. FIGS. 4 and 5 are just examples, and the invention is not limited to such example implementations.

The server system 150 uploads copies of each of the datastores 10, 20, and 30 in the client devices (510). The Sync Server 455 stores the metadata and data objects in such datastores in database 470, and File Server 465 stores the files in such datastore (step 512).

When client devices are online, the Sync Manager 425 on each client device maintains a dedicated connection with the server system 150. When online, each client device also registers with the sever system 150 for notices to changes to data relevant to such client device (515).

The user logs into the web interface provided by web server 440 to view user-accessible files stored by file server 465 (step 520). In response, the UI Application 442 on web server 440 requests the user-accessible files from Sync Server 455 (step 525). The Sync Server 455 retrieves metadata related to the user-accessible files from database 470 and sends the UI application 440 such metadata, as well as links to the actual files in the File Server 465 (530). The metadata includes information about how user-accessible files are organized in the file systems 420 of the client devices on which such files are stored.

The UI application 442 then provides the user with an interface through which to view and access the user-accessible files, where the interface includes a file-system view and one or more media-specific views (step 535)

If the user selects the file-system view, the File Manager 445 in the UI application 442 uses the metadata from the Sync Server 455 to show the file-system view. As stated above, in the file-system view, files are organized in the same way as they are organized in the file systems on the device(s) on which they are stored. If the user performs a file operation from the file-system view, the File Manager 445 notifies the Sync Server that the operation has been performed (step 540).

The Sync Server 455 then notifies the File Server 465 and the client applications 415 that have registered for notices related to such file of the operation (step 550). The File Server 465 modifies its copy of the relevant datastore(s) accordingly (step 590). Similarly, the client applications 415 notified of the change modify their file systems accordingly.

If the user selects or switches to a media-specific view, the Media Manager obtains the relevant files (i.e., the files of the media chosen) from the File Server 465. In the case of a media-specific view for data objects, the data objects may be stored in database 470 and retrieved by Sync Server 455. The Media Manager then uses the metadata and the files (or data objects) to provide a media-specific view (step 560). Users can access the content of files/data objects in the media-specific view.

If the user performs an operation on the content of a file in the media-specific view, the Media Manager notifies the Sync Server that the operation has been performed (step 570). The Sync Server 455 then notifies the File Server 465 and the client applications 415 that have registered for notices related to such file of the operation (step 580). The File Server modifies its copy of the relevant datastore(s) accordingly (step 590). Similarly, the client applications 415 notified of the change modify their file systems accordingly.

In one embodiment, if the user desires to perform a file operation (e.g., copy, move, paste, cut) on a file in the media-specific view, the Media Manager notifies the File Manager, and the user is automatically switched to the file-system view.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for displaying files from a plurality of devices in a multi-view interface and for enabling operations to be performed on such files through such interface, the method comprising:
   providing an interface having a view window, wherein, within the view window, a user is able to view, at the user's discretion, either a media-specific view or one of a plurality of file-system views, wherein each file-system view corresponds to a local file-system view on a different one of the plurality of devices and files within each file-system view are organized in the same way as files are organized in the corresponding local file-system view, wherein the media-specific view is a compilation view of all files from the plurality of devices that are designated with a particular media category, and wherein a user may view and edit files on one or more devices corresponding to the selected view in the view window;
   enabling a user to perform file operations in each of the file-system views in the interface, wherein file operations include deleting files from folders, copying files in folders, and pasting files to folders and wherein performing a file-system operation in a file-system view in the interface causes the file-system on the device to which the file-system view corresponds to be altered in accordance with the performed file-system operation and wherein the changes are also propagated to other devices having synchronized copies of the affected files;
   enabling a user to perform content-specific operations to be performed in a media-specific view in the interface; and
   enabling a user to switch between the file-system and media-specific views, and switching automatically from the media-specific view to the file-system view responsive to a file system operation performed in the media-specific view.

2. The method of claim 1, wherein the interface is a web interface.

3. The method of claim 1, wherein the media-specific view is one of the following: a photo view in which photo files are displayed, a music view in which music files are displayed, a video view in which video files are displayed, and a document view in which document files are displayed.

4. The method of claim 1, wherein a user also can view and edit data objects through the interface and the media-specific view corresponds to a type of data object.

5. The method of claim 4, wherein data objects include email messages.

6. The method of claim 4, wherein data objects include contacts.

7. The method of claim 4, wherein data objects include calendar items.

8. The method of claim 1, wherein in the interface, the user is able to select a media-specific view to see in the view window from one of a plurality of media-specific views available for view in the view window.

9. The method of claim 8, wherein the plurality of media-specific views include a photo view, a music view, a video view, and a documents view.

10. A method for viewing files from a plurality of devices, the method comprising:
   storing by a server files from a user's plurality of devices;
   providing an interface to the server via which the user is able to view the stored files, wherein the interface has a view window and, within the view window, the user is able to view, at the user's discretion, either a media-specific view or one of a plurality of file-system views, wherein each file-system view corresponds to a local file-system view on a different one of the plurality of devices and files within each file-system view are organized in the same way as files are organized in the corresponding local file-system view, and wherein the media-specific view is a compilation view of all the stored files that are designated with a particular media category;
   enabling the user to perform file operations in each of the file-system views in the interface, wherein file operations include deleting files from folders, copying files in folders, and pasting files to folders and wherein performing a file-system operation in a file-system view in the interface causes the file-system on the device to which the file-system view corresponds to be altered in accordance with the performed file-system operation;
   enabling the user to perform content-specific operations in the media-specific view in the interface; and
   enabling a user to switch between the file-system and media-specific views in the view window, and switching automatically from the media-specific view to the file-system view responsive to a file system operation performed in the media-specific view.

11. The method of claim 10, wherein the interface is a web interface.

12. The method of claim 10, wherein the media-specific view is a photo view in which a compilation of all the stored files designated as photos are displayed.

13. The method of claim 10, wherein the media-specific view is a music view in which a compilation of all the stored files designated as music files are displayed.

14. The method of claim 10, wherein the media-specific view is a video view in which a compilation of all the stored files designated as video files are displayed.

15. The method of claim 10, wherein the media-specific view is a document view in which a compilation of all the stored files designated as documents are displayed.

16. The method of claim 10, wherein a user also can view and edit data objects through the interface and the media-specific view corresponds to a type of data object.

17. The method of claim 16, wherein data objects include email messages.

18. The method of claim 16, wherein data objects include contacts.

19. The method of claim 16, wherein data objects include calendar items.

20. The method of claim 10, wherein in the interface, the user is able to select a media-specific view to see in the view window from one of a plurality of media-specific views available for view in the view window.

21. The method of claim 20, wherein the plurality of media-specific views include a photo view, a music view, a video view, and a documents view.

22. The method of claim 10, wherein one or more of the stored files are synchronized across two or more of the plurality of devices and, in response to a user making a change, via the interface, to a synchronized file, propagating the change to all the user's devices having the synchronized file.

23. The method of claim 10, wherein the stored files are organized into folders and wherein one or more folders are synchronized across two or more of the plurality of devices, and in response to a user making a change, via the interface, to a synchronized folder or to a file within the synchronized folder, propagating the change to all the devices having the synchronized folder.

24. A computer program embodied on one or more non-transitory computer-readable media and comprising code that when executed by a computer system, enables the computer system to perform the following method for viewing files from a plurality of devices, the method comprising:
   storing by a server files from a user's plurality of devices;
   providing an interface to the server via which the user is able to view the stored files, wherein the interface has a view window and, within the view window, the user is able to view, at the user's discretion, either a media-specific view or one of a plurality of file-system views, wherein each file-system view corresponds to a local file-system view on a different one of the plurality of devices and files within each file-system view are organized in the same way as files are organized in the corresponding local file-system view, and wherein the media-specific view is a compilation view of all the stored files that are designated with a particular media category;
   enabling the user to perform file operations in each of the file-system views in the interface, wherein file operations include deleting files from folders, copying files in folders, and pasting files to folders and wherein performing a file-system operation in a file-system view in the interface causes the file-system on the device to which the file-system view corresponds to be altered in accordance with the performed file-system operation;
   enabling the user to perform content-specific operations in the media-specific view in the interface; and
   enabling a user to switch between the file-system and media-specific views in the view window, and switching automatically from the media-specific view to the file-system view responsive to a file system operation performed in the media-specific view.

* * * * *

UNITED STATES PATENT AND TRADEMARK OFFICE
CERTIFICATE OF CORRECTION

PATENT NO.        : 9,032,295 B1
APPLICATION NO.   : 12/077533
DATED             : May 12, 2015
INVENTOR(S)       : Vivek Patel It is certified that error appears in the above-identified patent and that said Letters Patent is hereby corrected as shown below:

Title Page, Item (57) Abstract should read:

(57)                    ABSTRACT

In a synchronization or back-up system that synchronizes and/or backs-up files from multiple computing devices, the present invention provides a method for (1) displaying files from multiple computing devices in a multi-view user interface and (2) enabling content and file operations to be performed on such files through the user interface. The multi-view interface includes a file-system view and one or more media-specific views. In the file-system view files are organized in the same way in which they are organized on the devices on which they are stored. The file-system view in the interface looks essentially the same as the file-system view on client devices. In the file-system view, users can perform file operations on files. In the media-specific view files are organized by media category. In one embodiment of the media-specific view, files are organized by metadata that relates to the content of the files. In the media-specific view, users can perform content operations on the files.

Signed and Sealed this
Third Day of May, 2016

Michelle K. Lee
*Director of the United States Patent and Trademark Office*